(12) United States Patent
Gandhi et al.

(10) Patent No.: US 10,740,079 B2
(45) Date of Patent: Aug. 11, 2020

(54) MAINTAINING TIGHT COUPLING BETWEEN DRIVER AND APPLICATION VERSIONS

(71) Applicant: Microsoft Technology Licensing, LLC, Redmond, WA (US)

(72) Inventors: Viraf Rusi Gandhi, Kirkland, WA (US); Doron Joseph Holan, Mercer Island, WA (US); Zachary Allan Lockard, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/980,364

(22) Filed: May 15, 2018

(65) Prior Publication Data
US 2019/0354357 A1 Nov. 21, 2019

(51) Int. Cl.
*G06F 8/61* (2018.01)
*H04L 29/08* (2006.01)

(52) U.S. Cl.
CPC ............. *G06F 8/64* (2013.01); *H04L 67/34* (2013.01)

(58) Field of Classification Search
None
See application file for complete search history.

(56) References Cited

U.S. PATENT DOCUMENTS

| | | | | |
|---|---|---|---|---|
| 7,805,719 B2* | 9/2010 | O'Neill | .................... | G06F 8/654 717/168 |
| 7,971,047 B1* | 6/2011 | Vlaovic | ..................... | G06F 8/63 713/1 |
| 8,001,083 B1* | 8/2011 | Offer | .......................... | G06F 8/61 707/636 |
| 8,347,263 B1* | 1/2013 | Offer | .......................... | G06F 8/71 717/104 |
| 9,516,384 B2* | 12/2016 | Oh | ....................... | H04N 21/8586 |
| 10,261,775 B1* | 4/2019 | Ramsay | ............... | G06F 9/45558 |
| 2003/0229890 A1* | 12/2003 | Lau | ............................ | G06F 8/65 717/168 |
| 2007/0174833 A1* | 7/2007 | Im | .......................... | G06F 9/4411 717/174 |

(Continued)

OTHER PUBLICATIONS

J. Yoo, Y. Lee, D. Kim and K. Park, "An Android-based automotive middleware architecture for plug-and-play of applications," 2012 IEEE Conference on Open Systems, Kuala Lumpur, 2012, pp. 1-6. (Year: 2012).*

(Continued)

*Primary Examiner* — Wei Y Zhen
*Assistant Examiner* — Binh Luu
(74) *Attorney, Agent, or Firm* — Arent Fox LLP

(57) ABSTRACT

Methods and devices for selecting an application for download for use with hardware on a computer device may include receiving, from a remote application store, application metadata that includes at least one hardware constraint for an application in response to an application request for installation of the application. The methods and devices may include evaluating the application metadata to determine whether the at least one hardware constraint is satisfied on the computer device. The methods and devices may include installing the application when the at least one hardware constraint is satisfied on the computer device.

21 Claims, 5 Drawing Sheets

(56) References Cited

U.S. PATENT DOCUMENTS

| | | | | |
|---|---|---|---|---|
| 2009/0064132 A1* | 3/2009 | Suchy | ............... | G06F 8/61 |
| | | | | 717/177 |
| 2010/0153924 A1* | 6/2010 | Andrews | ............... | G06F 30/33 |
| | | | | 717/126 |
| 2013/0139139 A1* | 5/2013 | Mallur | ............... | G06F 8/65 |
| | | | | 717/170 |
| 2014/0325502 A1* | 10/2014 | Zarifis | ............... | G06F 8/61 |
| | | | | 717/177 |
| 2014/0359602 A1* | 12/2014 | Sawaya | ............... | G06F 8/61 |
| | | | | 717/176 |
| 2016/0300242 A1* | 10/2016 | Truong | ............... | G10L 17/22 |
| 2016/0378454 A1* | 12/2016 | Nekrestyanov | ............... | H04L 67/34 |
| | | | | 717/170 |
| 2018/0300180 A1* | 10/2018 | Shepard | ............... | G06F 11/0709 |

OTHER PUBLICATIONS

K. Lee, S. G. Hong and N. Kim, "Plug and Play SensorApp Service scenarios," 2015 17th International Conference on Advanced Communication Technology (ICACT), Seoul, 2015, pp. 539-542. (Year: 2015).*

* cited by examiner

MAINTAINING TIGHT COUPLING BETWEEN DRIVER AND APPLICATION VERSIONS

BACKGROUND

The present disclosure relates to identifying available applications for use with a computer device.

Many applications are designed to work with specific hardware of a computer device. Moreover, these applications may provide a unique hardware and/or software experiences. For example, applications may be published by device manufacturers to officially enable users to manage and/or operate devices of the manufacturers. In addition, third parties may publish applications to work with specific devices and/or enhance a user's experience when using the devices. As such, many independent hardware vendors (IHVs) and/or original equipment manufacturers (OEMs), may create their own applications to control their hardware settings and provide additional differentiation from other applications. The applications may be packaged and installed with drivers, which has created some problems for service reliability. When updates occur to the applications, there may be a lack of coordinated install between specific application versions and the driver packages.

Thus, there is a need in the art for improvements in identifying available applications for use with a computer device.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include memory to store data and instructions, a processor in communication with the memory, an operating system in communication with the memory and the processer, wherein the operating system is operable to: receive, from a remote application store, application metadata that includes at least one hardware constraint for an application in response to an application request for installation of the application; evaluate the application metadata to determine whether the at least one hardware constraint is satisfied on the computer device; and install the application when the at least one hardware constraint is satisfied on the computer device.

Another example implementation relates to a method for selecting an application for download for use with hardware on a computer device. The method may include receiving, from a remote application store at an operating system executing on the computer device, application metadata that includes at least one hardware constraint for an application in response to an application request for installation of the application. The method may include evaluating the application metadata to determine whether the at least one hardware constraint is satisfied on the computer device. The method may include installing the application when the at least one hardware constraint is satisfied on the computer device.

Another example implementation relates to a computer-readable medium storing instructions executable by a computer device. The computer-readable medium may include at least one instruction for causing the computer device to receive, from a remote application store, application metadata that includes at least one hardware constraint for an application in response to an application request for installation of the application. The computer-readable medium may include at least one instruction for causing the computer device to evaluate the application metadata to determine whether the at least one hardware constraint is satisfied on the computer device. The computer-readable medium may include at least one instruction for causing the computer device to install the application when the at least one hardware constraint is satisfied on the computer device.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
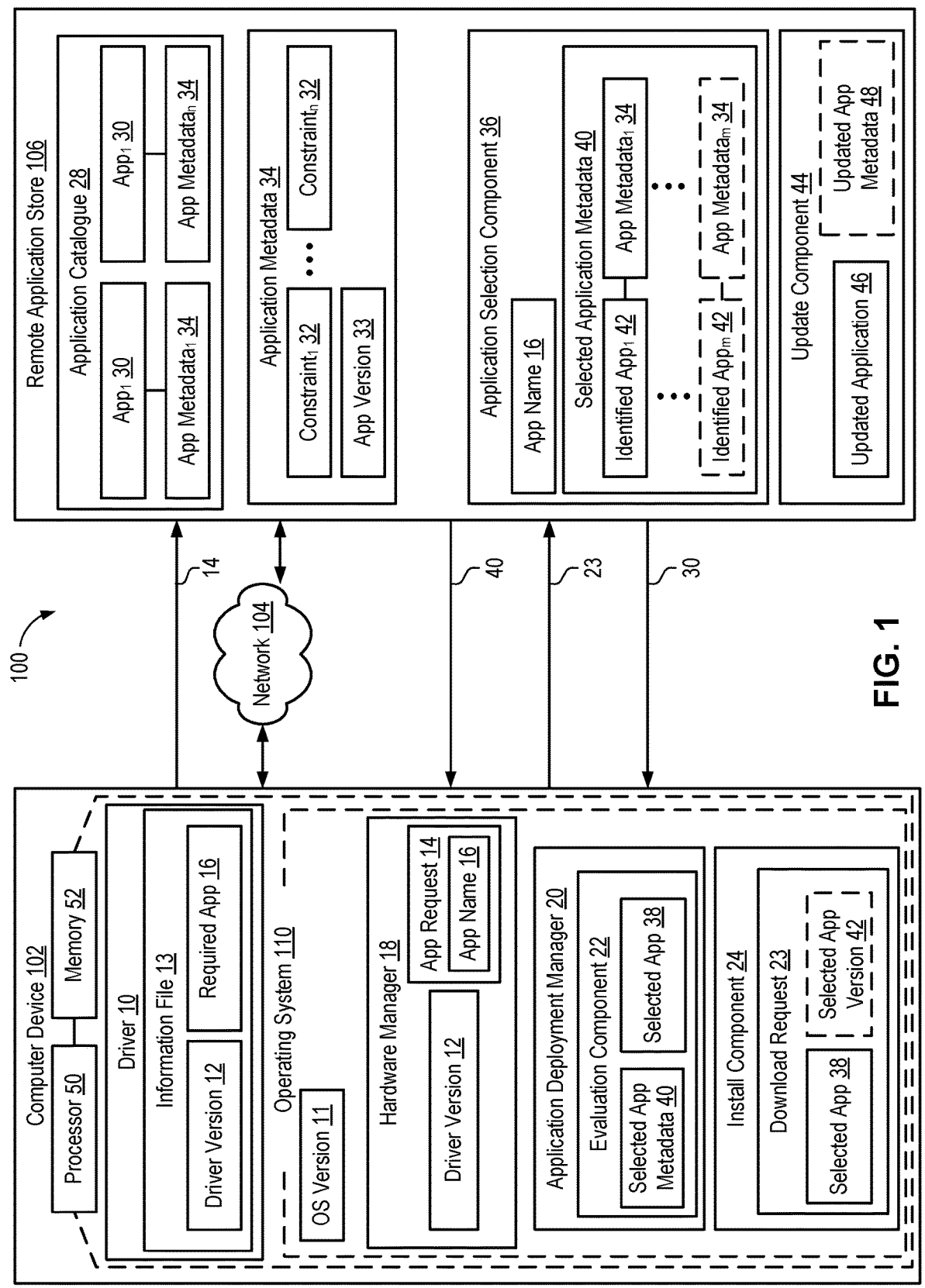
FIG. 1 is a schematic block diagram of an example computer device in communication with an example remote application store in accordance with an implementation.

This disclosure relates to devices and methods for identifying available hardware support applications in an application store for use with hardware of computer devices. The methods and devices may automatically install the applications on the computer devices when a match occurs between the hardware installed on the computer device and the version of the application in the application store. Hardware support applications may provide a unique hardware and/or software experience and may be published by device manufacturers to officially enable users to manage and/or operate devices of the manufacturers. In addition, third parties may publish applications to work with specific devices and/or to enhance a user's experience when using the devices. As such, many independent hardware vendors (IHVs) and/or OEMs may create their own applications to control their hardware settings and provide additional differentiation from other applications.

These hardware support applications (HSAs), such as OEM control panels, may be packaged and installed with drivers, which has created some problems for service reliability. Generally, the only feasible way to install these hardware applications outside of imaging time is through a driver package, specifically a co-installer, which is compiled third party code run at driver installation time. The close relationship between drivers and applications, and the fact that they are delivered through a single mechanism may lead to sloppy development practices, which may result in drivers that depend on these user-mode applications. In addition, device or even operating system crashes may result where one of these hardware support applications ceases to function, or does not get migrated correctly during an operating system update. While the rest of the industry may be moving applications to remote application stores, hardware support applications have not been moved to the remote application stores because of a lack of coordination between the version of specific applications in the remote application stores and the underlying driver packages of the applications.

The devices and methods may include additional application metadata in a remote application store that identifies one or more constraints required for the applications. Constraints may identify a hardware dependency required by an application in order for the application to function properly and/or improve a performance of the application. Example constraints may include, but are not limited to, a required operating system, a required operating system version, a required driver, a required driver version, and/or a driver date.

The devices and methods may include a device driver that includes a driver package that identifies a required application for the device driver. The required applications may be hardware support applications (HSA) that control hardware settings and/or provide a unique software experience for the hardware of the computer device. An application request with the required application may be sent to a remote application store requesting the required application. The remote application store may identify one or more versions of the required application and may transmit associated application metadata for the identified applications. The identified applications may be a subset of the applications in the remote application store.

The devices and methods may evaluate the received application metadata and may select an application for download when the constraints for the identified application match the hardware operating on the computer device. As such, by ensuring that the applications downloaded to the computer device may be compatible with the hardware operating on the computer device prior to downloading the application, nonfunctioning applications and/or operating system crashes may be mitigated and/or reduced. When an application is updated, the updated application may be downloaded to the computer device, if the hardware operating on the computer device supports the updated application. Thus, as the applications and/or drivers are updated, the correct version of the application may be downloaded to the computer device so that the applications may continue to operate correctly with the drivers.

Referring now to FIG. 1, illustrated is an example system 100 that may be used for identifying applications for use with hardware of a computer device 102 and/or downloading the applications to computer device 102. Computer device 102 may be in communication with one or more remote application stores 106 via a wireless and/or wired network 104. In an implementation, remote application store 106 may be on computer device 102. Remote application stores 106 may have an application catalogue 28 with a plurality of applications 30 up to n (where n is an integer) that computer device 102 may retrieve for use on computer device 102.

Application metadata 34 may be associated with the one or more applications 30. Application metadata 34 may include, but is not limited to, an application version 33 of the application 30 and one or more constraints 32 that may be associated with the application 30. Constraints 32 may identify a hardware dependency required by application 30 in order for application 30 to function properly and/or improve a performance of application 30. For example, a game application may not be usable unless a minimum version of a driver is present on computer device 102 (e.g., the game play experience is so bad without the driver that the game developer does not want the game to be played without the minimum version of the driver). Another example may include a game application that runs better when a minimum version of a driver is present on computer device 102.

The hardware dependency may be identified as a minimum hardware required for application 30 (e.g., at least version 1.0), for example, for proper operation and/or execution of the hardware by application 30. In addition, the hardware dependency may be identified as a maximum hardware requirement for application 30 (e.g., application 30 may not work with version 2.0). Example constraints 32 may include, but are not limited to, a required operating system, a required operating system version, a required driver, a required driver version, and/or a driver date. As such, the application metadata 34 may be used identify any hardware dependencies that may be required for applications 30. The application metadata 34 may also be used to prevent non-compatible applications from being downloaded to computer device 102 and/or to improve the performance of applications 30 downloaded to computer device 102.

Computer device 102 may have one or more drivers 10 installed on computer device 102. Driver 10 may include an information file 13 that identifies a driver version 12 of driver 10 and one or more required applications 16 that may be needed for use with driver 10. The required applications 16 may be hardware support applications (HSA) that control hardware settings, provide a unique software experience for the hardware, and/or may allow a user to interact with driver 10.

The required applications 16 may include, but are not limited to, companion applications. Companion applications may include, for example, applications published by an original equipment manufacturer (OEM) or an independent hardware vendor (IHV) officially to enable users to manage and/or operate a device. For example, a companion application may be the OEM's control panel application which is intended for a one to one match with the hardware type and the only official hardware support application for that hardware ID.

Upon installation of driver 10, a hardware manager 18 may read the information file 13 and may determine that one or more required applications 16 may be included in the information file 13. For example, the one or more required applications 16 may include an application package family name (PFN) that may identify a series of different versions of the required applications 16. The package family name may be a unique identifier that identifies all versions of the same application. Hardware manager 18 may send an application request 14 to remote application store 106 requesting the one or more required applications 16 identified in the information file 13. The application request 14 may only include the name of the one or more required applications 16. Remote application store 106 may be responsible for choosing a correct version of the required application 16 to transmit to computer device 102.

Remote application store 106 may include an application selection component 36 that receives the one or more required applications 16 from computer device 102 and may identify one or more applications 42 that corresponds to the one or more required applications 16. The identified applications 42 may be a subset of the applications 30 included in the application catalogue 28. In addition, the identified applications 42 may be different versions of the same required application 16.

Application selection component 36 may also retrieve the associated application metadata 34 for the identified applications 42. Application selection component 36 may transmit the selected application metadata 40 for the identified applications 42 to computer device 102. The selected application metadata 40 may include application metadata 34 for each of the identified applications 42.

Computer device 102 may include an operating system 110 executed by processor 50 and/or system memory 52 of computer device 102. System memory 52 may be configured for storing data and/or computer-executable instructions defining and/or associated with operating system 110, and processor 50 may execute operating system 110. An example of system memory 52 can include, but is not limited to, a type of memory usable by a computer, such as random access memory (RAM), read only memory (ROM), tapes, magnetic discs, optical discs, volatile memory, non-volatile memory, and any combination thereof. An example of processor 50 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 110 may include an application deployment manager 20 that may receive the selected application metadata 40 and may use the selected application metadata 40 in selecting an application 38 to download and install on computer device 102. Application deployment manager 20 may include an evaluation component 22 that evaluates the selected application metadata 40 along with any constraints 32 identified in the selected application metadata 40. Evaluation component 22 may select an application 38 for download on computer device 102 when a match occurs between the identified constraints 32 and the hardware operating on computer device 102.

For example, evaluation component 22 may evaluate one or more constraints 32 of the selected application metadata 40. The constraint 32 may identify "driver version 1.0" as a minimum driver version 12 that the associated identified application 42 may need to operate correctly. Evaluation component 22 may communicate with hardware manager 18 to determine that the driver version 12 of driver 10 is "driver version 1.2." Since the driver version 1.2 of driver 10 is greater than the minimum driver requirement of "driver version 1.0," evaluation component 22 may determine that a match occurred between the application metadata 34 associated with the identified application 42. As such, evaluation component 22 may select the identified application 42 for download to computer device 102.

In an implementation, evaluation component 22 may start with a newest application version when evaluating the selected application metadata 40. For example, if remote application store 106 transmitted a plurality of application metadata 34 for various versions of the same application, evaluation component 22 may start with the newest application version when comparing the constraints 32 of the identified applications 42 with the hardware of computer device 102. If a match does not occur between the constraints 32 with the hardware, evaluation component 22 may evaluate an older version of the identified application 42. For example, the newest version of the identified application 42 may be "application version 1.3" and the application may require a "driver version 2.0." If a match does not occur with "application version 1.3" of identified application 42 and the driver version on computer device (e.g., the driver version is "driver version 1.2"), evaluation component 22 may evaluation a next version of identified application 42 (e.g., "application version 1.2). Evaluation component 22 may continue in a recursive manner, evaluating older versions of the identified application 42 until a match occurs between the constraints 32 of the identified applications 42 and the hardware. As such, the newest version of the application that satisfies the constraints 32 may be downloaded to computer device 102.

In another implementation, evaluation component 22 may start with an oldest application version when evaluating the selected application metadata 40 and recursively evaluate newer applications until a compatibility is determined by evaluation component 22 with the constraints 32 of the identified applications 42 and the hardware. When a match occurs between the constraints 32 and the hardware, evaluation component 22 may select the corresponding application for download to computer device 102.

As such, a variety of searches may be performed by evaluation component 22 to identify the correct version of an application to download and use with driver 10 and/or operating system 110 of computer device 102. Moreover, by ensuring that the application downloaded to computer device 102 is compatible with the hardware operating on computer device 102 before downloading the application, nonfunctioning applications and/or operating system crashes may be mitigated and/or reduced.

When a match occurs between the constraints 32 of the identified applications 42 with the hardware, evaluation component 22 may communicate with an install component 24 to install the selected application 38 associated with the selected application metadata 40.

Install component 24 may send a download request 23 to remote application store 106 requesting the selected application 38. In an implementation, the download request 23 may also include the selected application version 42. Remote application store 106 may transmit to computer device the application 30 from the application catalogue 28 that matches the selected application 38 so that the application 30 may be installed on computer device 102.

In an implementation, when an application is updated, remote application store 106 may include an update component 44 that receives the updated application 46. In addition, update component 44 may receive any updated application metadata 48 associated with the updated application 46. If a required hardware dependency and/or any other application dependency information changes for the updated application 46, the updated application metadata 48 may capture the changes. As such, the updated application metadata 48 may be used to ensure that the updated application 46 may be installed on appropriate systems. If the driver version operating on computer device 102 does not match the constraint 32 of the updated application, the updated application 46 may not be sent to computer device 102 until the hardware on computer device 102 is updated. Moreover, applications may be updated independently without artificially publishing an update to a driver if only the application changed.

As such, by ensuring that the applications downloaded to computer device 102 are compatible with the hardware operating on computer device 102 prior to downloading the application, nonfunctioning applications and/or operating system crashes may be mitigated and/or reduced.

Figure 2:
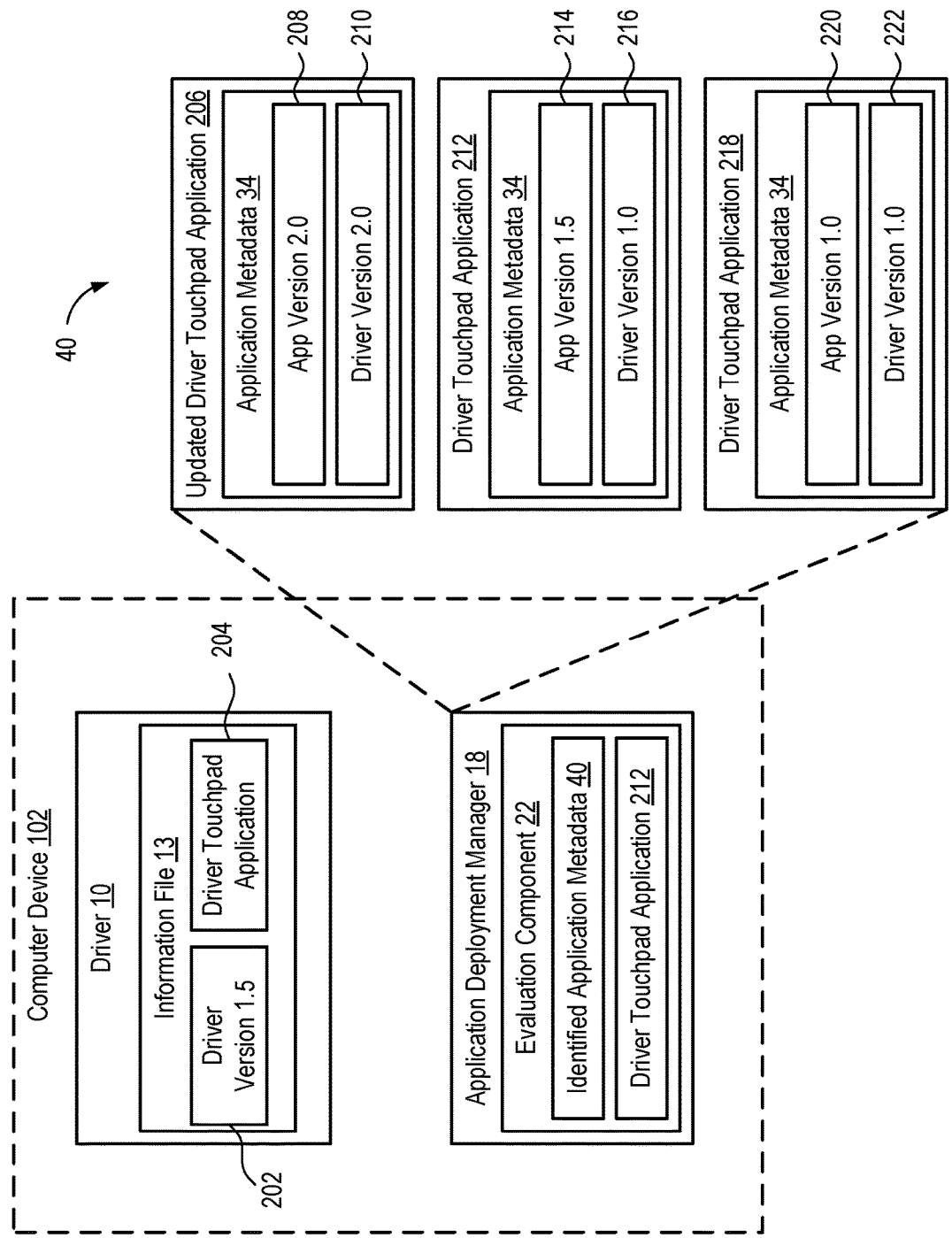
FIG. 2 is an example of selecting an application for download for use on a computer device after application is updated in accordance with an implementation.

Referring now to FIG. 2, illustrated is an example of selecting an application for download for use on computer device 102 after an application is updated. For example, computer device 102 may include driver 10. Driver 10 may include an information file 13 that identifies the driver version 202 as "driver version 1.5." In addition, the information file 13 may include a required application 204 identified as a "driver touchpad application" that driver 10 may need downloaded so that a user may calibrate a touchpad associated with computer device 102.

An updated driver touchpad application 206 may be added to a remote application store 106 (FIG. 1). As discussed above in FIG. 1, application deployment manager 20 may receive selected application metadata 40 with a plurality of application metadata 34 in response to an application request 14 (FIG. 1) for the required application 204, a driver touchpad application. The application metadata 34 for the updated driver touchpad application 206 may indicate that the application version 208 is "application version 2.0" and a constraint 210 for the updated driver touchpad application 206 is a minimum "driver version 2.0." The application metadata 34 for driver touchpad application 212 may indicate that the application version 214 is "application version 1.5" and a constraint 216 for driver touchpad application 212 is a minimum "driver version 1.0." The application metadata 34 for driver touchpad application 218 may indicate that the application version 220 is "application version 1.0" and a constraint 222 of a minimum "driver version 1.0."

Evaluation component 22 may start with the application metadata 34 for the updated driver touchpad application 206 when determining which application to select for download to computer device 102. Evaluation component 22 may compare the constraint 210 of a minimum "driver version 2.0" with the driver version currently operating on computer device 102, "driver version 1.5." Evaluation component 22 may determine that the driver version 202 operating on computer device 102 does not match the required minimum driver version indicated in the constraint 210 for updated driver touchpad application 206, as such, evaluation component 22 may next evaluate the application metadata data 34 associated with a next version of the driver touchpad application 212.

Evaluation component 22 may compare the constraint 216 of a minimum "driver version 1.0" with the driver version currently operating on computer device 102, "driver version 1.5." Evaluation component 22 may determine that the driver version currently operating on computer device 102 exceeds the minimum driver requirement indicated in the constraint 216 of the application metadata 34 associated with driver touchpad application 212. Evaluation component 22 may determine that a match has occurred between the identified constraint 216 and the driver version 202. Once a match occurs, evaluation component 22 may not evaluate the remaining selected application metadata 40 and may select the driver touchpad application 212 as the application to download and install on computer device 102. Thus, even though an updated driver touchpad application 206 was added to the remote application store 106, the updated driver touchpad application 206 may not be downloaded to computer device 102 because the hardware constraint 210 identified in the updated application was not satisfied by the hardware operating on computer device 102.

Figure 3:
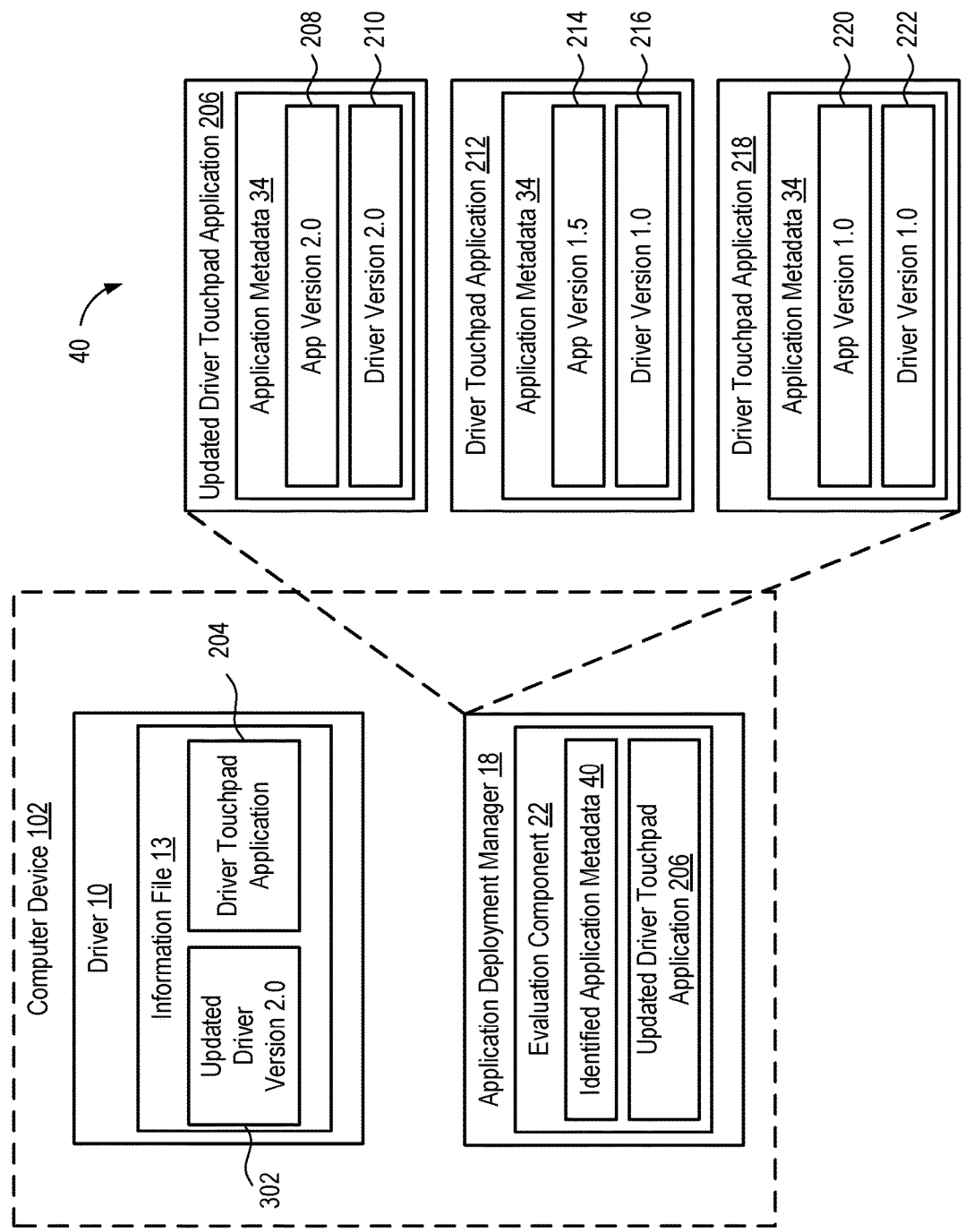
FIG. 3 is an example of selecting an application for download for use on a computer device after a driver version is updated in accordance with an implementation.

Referring now to FIG. 3, illustrated is an example of selecting an application for download for use on computer device 102 after a driver version is updated. For example, computer device 102 may include driver 10. Driver 10 may include an information file 13 that identifies that the updated driver version 302 of driver 10 is "driver version 2.0." In addition, the information file 13 may include a required application 204 identified as a "driver touchpad application" that driver 10 may need downloaded so that a user may calibrate a touchpad associated with computer device 102.

An updated driver touchpad application 206 may be added to a remote application store 106 (FIG. 1). As discussed above in FIG. 1, application deployment manager 20 may receive selected application metadata 40 with a plurality of application metadata 34 in response to an application request 14 (FIG. 1) for the required application 204, a driver touchpad application. The application metadata 34 for the updated driver touchpad application 206 may indicate that the application version 208 is "application version 2.0" and a constraint 210 for the updated driver touchpad application 206 is a minimum "driver version 2.0" The application metadata 34 for driver touchpad application 212 may indicate that the application version 214 is "application version 1.5" and a constraint 216 for driver touchpad application 212 is a minimum "driver version 1.0." The application metadata 34 for driver touchpad application 218 may indicate that the application version 220 is "application version 1.0" and a constraint 222 of a minimum "driver version 1.0."

Evaluation component 22 may start with the application metadata 34 for the updated driver touchpad application 206 when determining which application to select for download to computer device 102. Evaluation component 22 may compare the constraint 210 of a minimum "driver version 2.0" with the updated driver version currently operating on computer device 102, "driver version 2.0." Evaluation component 22 may determine that a match has occurred between the identified constraint 210 (e.g., a minimum version of a driver) and the driver version 202 operating on computer device 102. Once a match occurs, evaluation component 22 may not evaluate the remaining selected application metadata 40 and may select updated driver touchpad application 206 as the application to download and install on computer device 102.

Figure 4:
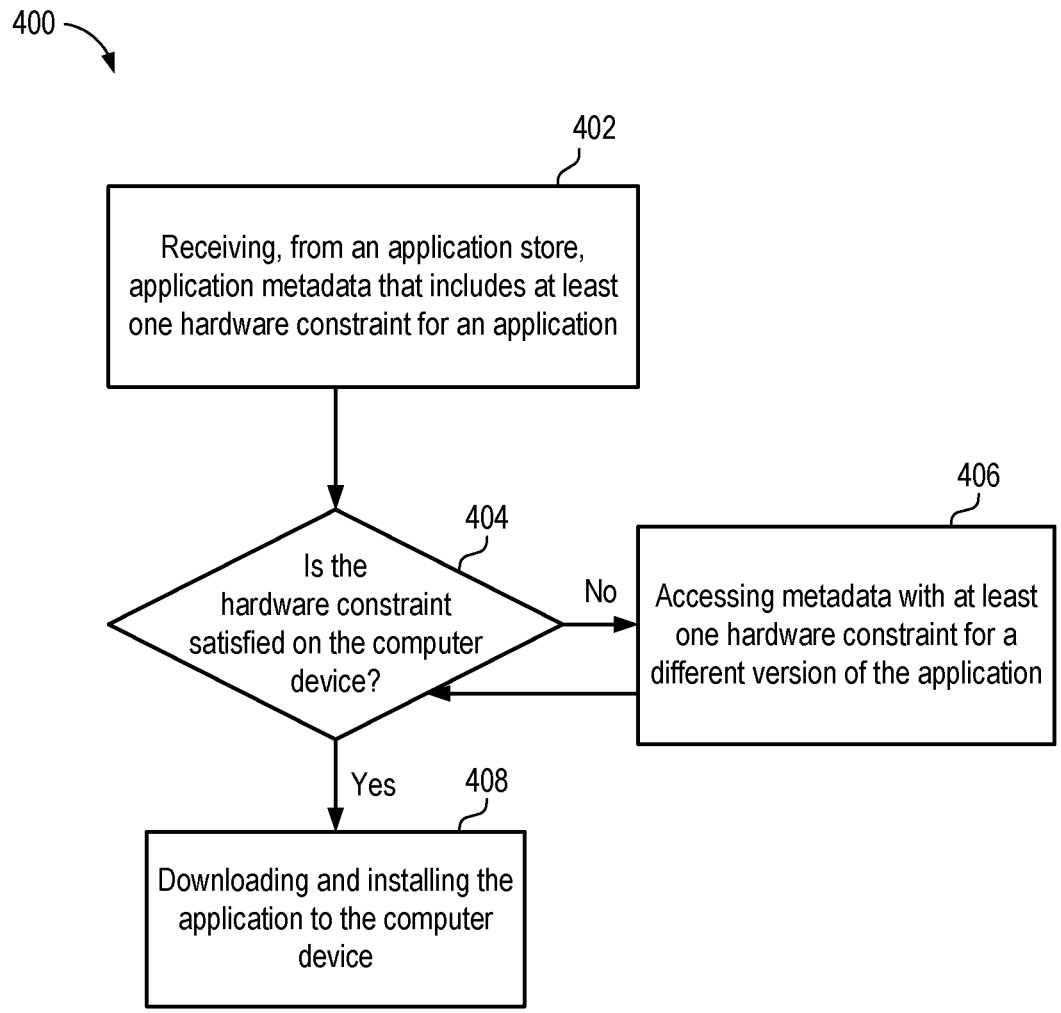
FIG. 4 is an example method flow for selecting an application for download for use with hardware on a computer device in accordance with an implementation.

Referring now to FIG. 4, an example method 400 may be used by computer device 102 (FIG. 1) for selecting an application for download for use with hardware on computer device 102 (FIG. 1). The actions of method 400 may be discussed below with reference to the architecture of FIG. 1.

At 402, method 400 may include receiving, from an application store, application metadata that includes at least one hardware constraint for an application. Computer device 102 may have one or more drivers 10 installed on computer device 102. Upon installation of driver 10, a hardware manager 18 may read the information file 13 and may determine that one or more required applications 16 may be included in the information file 13. For example, the one or more required applications 16 may include an application package family name (PFN) that may identify a series of different versions of the required applications 16. Hardware manager 18 may send an application request 14 to remote application store 106 requesting the one or more required applications 16 identified in the information file 13.

Remote application store 106 may include an application selection component 36 that receives the one or more required applications 16 from computer device 102 and may identify one or more applications 42 that corresponds to the one or more required applications 16. Application selection component 36 may also retrieve the associated application metadata 34 for the identified applications 42. Application selection component 36 may transmit the selected application metadata 40 for the identified applications 42 to computer device 102. The selected application metadata 40 may include application metadata 34 for each of the identified applications 42.

An application deployment manager 20 on computer device 102 may receive the selected application metadata 40 and may use the selected application metadata 40 in selecting an application 38 to download and install on computer device 102. Application deployment manager 20 may include an evaluation component 22 that evaluates the selected application metadata 40 along with any constraints 32 identified in the selected application metadata 40.

At 404, method 400 may include determining whether the at least one hardware constraint is satisfied on the computer device. For example, evaluation component 22 may evaluate one or more constraints 32 of the selected application metadata 40. The constraint 32 may identify "driver version 1.0" as a minimum driver version 12 that the associated identified application 42 may need to operate correctly. Evaluation component 22 may communicate with hardware manager 18 to determine that the driver version 12 of driver 10 is "driver version 1.2." Since the driver version 1.2 of driver 10 is greater than the minimum driver requirement of "driver version 1.0," evaluation component 22 may determine that a match occurred between the application metadata 34 associated with the identified application 42.

In an implementation, evaluation component 22 may start with a newest application version when evaluating the selected application metadata 40. For example, if remote application store 106 transmitted a plurality of application metadata 34 for various versions of the same application, evaluation component 22 may start with the newest application version when comparing the constraints 32 of the identified applications 42 with the hardware of computer device 102.

In another implementation, evaluation component 22 may start with an oldest application version when evaluating the selected application metadata 40 and recursively evaluate newer applications until a compatibility is determined by evaluation component 22 with the constraints 32 of the identified applications 42 and the hardware. When a match occurs between the constraints 32 and the hardware, evaluation component 22 may select the corresponding application for download to computer device 102.

As such, a variety of searches may be performed by evaluation component 22 to identify the correct version of an application to download and use with driver 10 and/or operating system 110 of computer device 102.

At 406, method 400 may include accessing metadata with at least one hardware constraint for a different version of the application when the at least one hardware constraint is not satisfied on the computer device. If a match does not occur between the constraints 32 with the hardware, evaluation component 22 may evaluate an older version of the identified application 42. For example, the newest version of the identified application 42 may be "application version 1.3" and the application may require a "driver version 2.0." If a match does not occur with "application version 1.3" of identified application 42 and the driver version on computer device (e.g., the driver version is "driver version 1.2"), evaluation component 22 may evaluation a next version of identified application 42 (e.g., "application version 1.2). Evaluation component 22 may continue in a recursive manner, evaluating older versions of the identified application 42 until a match occurs between the constraints 32 of the identified applications 42 and the hardware. As such, the newest version of the application that satisfies the constraints 32 may be downloaded to computer device 102.

At 408, method 400 may include downloading and installing the application to the computer device when the at least one hardware constraint is satisfied on the computer device. When a match occurs between the constraints 32 of the identified applications 42 with the hardware, evaluation component 22 may communicate with an install component 24 to install the selected application 38 associated with the selected application metadata 40.

Install component 24 may send a download request 23 to remote application store 106 requesting the selected application 38. In an implementation, the download request 23 may also include the selected application version 42. Remote application store 106 may transmit to computer device the application 30 from the application catalogue 28 that matches the selected application 38 so that the application 30 may be installed on computer device 102.

By ensuring that the application downloaded to computer device 102 is compatible with the hardware operating on computer device 102 before downloading the application, nonfunctioning applications and/or operating system crashes may be mitigated and/or reduced.

Figure 5:
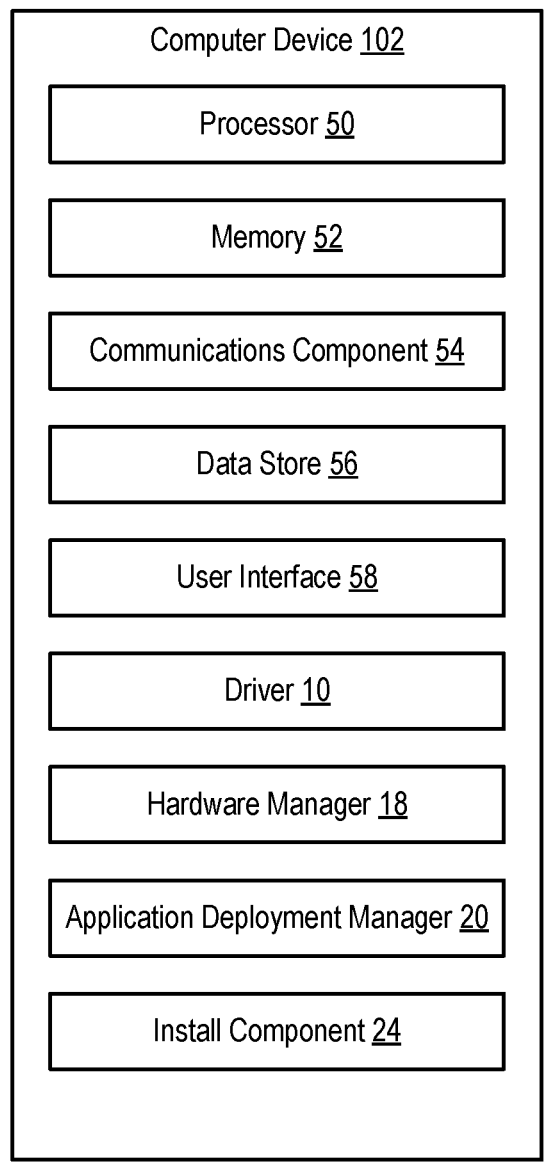
FIG. 5 is a schematic block diagram of an example computer device in accordance with an implementation of the present disclosure.

Referring now to FIG. 5, illustrated is an example computer device 102 in accordance with an implementation, including additional component details as compared to FIG. 1. In one example, computer device 102 may include processor 50 for carrying out processing functions associated with one or more of components and functions described herein. Processor 50 can include a single or multiple set of processors or multi-core processors. Moreover, processor 50 can be implemented as an integrated processing system and/or a distributed processing system.

Computer device 102 may further include memory 52, such as for storing local versions of applications being executed by processor 50. Memory 52 can include a type of memory usable by a computer, such as random access memory (RAM), read only memory (ROM), tapes, magnetic discs, optical discs, volatile memory, non-volatile memory, and any combination thereof Further, computer device 102 may include a communications component 54 that provides for establishing and maintaining communications with one or more parties utilizing hardware, software, and services as described herein. Communications component 54 may carry communications between components on computer device 102, as well as between computer device 102 and external devices, such as devices located across a communications network and/or devices serially or locally connected to computer device 102. For example, communications component 54 may include one or more buses, and may further include transmit chain components and receive chain components associated with a transmitter and receiver, respectively, operable for interfacing with external devices.

Additionally, computer device 102 may include a data store 56, which can be any suitable combination of hardware and/or software, that provides for mass storage of information, databases, and programs employed in connection with implementations described herein. For example, data store 56 may be a data repository for driver 10 (FIG. 1), hardware manager 18 (FIG. 1), application deployment manager 20 (FIG. 1) and/or install component 24 (FIG. 1).

Computer device 102 may also include a user interface 58 operable to receive inputs from a user of computer device 102 and further operable to generate outputs for presentation to the user. User interface 58 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface 58 may include one or more output devices, including but not limited to a display, a speaker, a haptic feedback mechanism, a printer, any other mechanism capable of presenting an output to a user, or any combination thereof.

In an implementation, user interface 58 may transmit and/or receive messages corresponding to the operation of device driver 10, hardware manager 18, application deployment manager 20 and/or install component 24. In addition, processor 50 executes device driver 10, hardware manager 18, application deployment manager 20 and/or install component 24, and memory 52 or data store 56 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a memory to store data and instructions;
a processor in communication with the memory;
an operating system executing on the computer device and in communication with the memory and the processer, wherein the operating system is operable to:
read an information file associated with a device driver installed on the computer device hardware based on installation of corresponding hardware on the computer device;
determine, from the information file and based on installation of the device driver, an identifier of an application for use with the hardware;
sending, to a remote application store based on determining the identifier, a request to install the application on the computer device;
receive, from the remote application store, application metadata that includes at least one hardware constraint for each of multiple versions of the application in response to the request to install the application;
evaluate the application metadata for at least two of the multiple versions of the application to determine whether the at least one hardware constraint is satisfied on the computer device for one of the at least two of the multiple versions of the application; and
install, based on determining that the at least one hardware constraint is satisfied for the one of the at least two of the multiple versions of the application, the one of the at least two of the multiple versions of the application on the computer device.

2. The computer device of claim 1, wherein the at least one hardware constraint is an operating system version of the operating system.

3. The computer device of claim 1, wherein the at least one hardware constraint is a required third party component installed on the computer device.

4. The computer device of claim 3, wherein the required third party component is a required driver version.

5. The computer device of claim 4, wherein the operating system determines that the at least one hardware constraint is satisfied on the computer device when a driver version of the device driver operating on the computer device matches the required driver version.

6. The computer device of claim 1, wherein the operating system is further operable to:
evaluate different application metadata with a different hardware constraint for a different application when the at least one hardware constraint is not satisfied on the computer device to determine whether the different hardware constraint is satisfied on the computer device; and
install the different application when the different hardware constraint is satisfied on the computer device.

7. The computer device of claim 6, wherein the different application is a different version of the application.

8. The computer device of claim 1, wherein the operating system is operable to:
receive an updated version of the application and updated application metadata with an updated hardware constraint for the updated version of the application;
evaluate the updated application metadata to determine whether the updated hardware constraint is satisfied on the computer device; and
install the updated version of the application when the updated hardware constraint is satisfied.

9. The computer device of claim 1, wherein the application is a hardware support application.

10. A method for selecting an application for download for use with hardware on a computer device, comprising:
reading, by an operating system executing on the computer device, an information file associated with a device driver installed on the computer device based on installation of corresponding hardware on the computer device;
determining, by the operating system and from the information file and based on installation of the device driver, an identifier of an application for use with the hardware;
sending, by the operating system to a remote application store based on determining the identifier, a request to install the application on the computer device;
receiving, by the operating system and from the remote application store, application metadata that includes at least one hardware constraint for each of multiple versions of the application in response to the request to install the application;
evaluating the application metadata for at least two of the multiple versions of the application to determine whether the at least one hardware constraint is satisfied on the computer device for one of the at least two of the multiple versions of the application; and
installing, based on determining that the at least one hardware constraint is satisfied for the one of the at least two of the multiple versions of the application, the one of the at least two of the multiple versions of the application on the computer device.

11. The method of claim 10, wherein the at least one hardware constraint is an operating system version of the operating system.

12. The method of claim 10, wherein the at least one hardware constraint is a required third party component installed on the computer device.

13. The method of claim 12, wherein the required third party component is a driver version.

14. The method of claim 13, wherein determining that the at least one hardware constraint is satisfied on the computer device occurs when a driver version of the device driver operating on the computer device matches the required driver version.

15. The method of claim 10, further comprising:
evaluating different application metadata with a different hardware constraint for a different application when the at least one hardware constraint is not satisfied on the computer device to determine whether the different hardware constraint is satisfied on the computer device; and
installing the different application when the different hardware constraint is satisfied on the computer device.

16. The method of claim 15, wherein the different application is a different version of the application.

17. The method of claim 10, further comprising:
receiving an updated version of the application and updated application metadata with an updated hardware constraint for the updated version of the application;
evaluating the updated application metadata to determine whether the updated hardware constraint is satisfied on the computer device; and
installing the updated version of the application when the updated hardware constraint is satisfied.

18. The method of claim 10, wherein the application is a hardware support application.

19. The method of claim 10, further comprising determining to install the one of the at least two of the multiple versions of the application, which is an older version of the application than a second application of the at least two of the multiple versions of the application, based at least in part on determining that the at least one hardware constraint is not satisfied for the second application and is satisfied for the one of the at least two of the multiple versions of the application.

20. A non-transitory computer-readable medium storing instructions executable by a computer device, comprising:
- at least one instruction for causing the computer device to read, by an operating system executing on the computer device, an information file associated with a device driver installed on the computer device based on installation of corresponding hardware on the computer device;
- at least one instruction for causing the computer device to determine, by the operating system and from the information file and based on installation of the device driver, an identifier of an application for use with the hardware;
- at least one instruction for causing the computer device to send, by the operating system to a remote application store based on determining the identifier, a request to install the application on the computer device;
- at least one instruction for causing the computer device to receive, by the operating system and from the remote application store, application metadata that includes at least one hardware constraint for each of multiple versions of the application in response to the request to install the application;
- at least one instruction for causing the computer device to evaluate the application metadata for at least two of the multiple versions of the application to determine whether the at least one hardware constraint is satisfied on the computer device for one of the at least two of the multiple versions of the application; and
- at least one instruction for causing the computer device to install, based on determining that the at least one hardware constraint is satisfied for the one of the at least two of the multiple versions of the application, the one of the at least two of the multiple versions of the application on the computer device.

21. The non-transitory computer-readable medium of claim 20, wherein the application is a hardware support application.

* * * * *